Feb. 2, 1960

A. F. GARBARINO 2,923,511

REINFORCED PALLET

Filed Jan. 3, 1955

Inventor:
A. Frank Garbarino,
by Yardley Chittick
Attorney ced Feb. 2, 1960

2,923,511

REINFORCED PALLET

Americo Frank Garbarino, West Acton, Mass., assignor to Lewis-Shepard Company, Watertown, Mass., a corporation of Massachusetts Application January 3, 1955, Serial No. 479,470

3 Claims. (Cl. 248—120)

This invention relates to improvements in pallets of the type that are commonly used with lift trucks.

As is well known pallets are commonly used in factories, warehouses, freight terminals, and elsewhere for facilitating transfer of various kinds of goods. In the normal situation the pallets are subjected to rigorous use, with goods constantly being piled thereon and removed therefrom, and the pallets are repeatedly lifted, transferred and deposited by a lift truck. Being customarily manufactured of wood, the pallets become worn and eventually broken under normal use, necessitating purchase of new pallets. While the structural strength of the pallets may be improved by use of more durable materials, there has been a continuous compromise between cost and quality of the pallets due to the fact that the number of pallets that may be in use in a given installation may be so large that the total cost becomes a material factor in determining the economic practicability of a lift truck transfer system.

For this reason the usual pallet is of simple construction, usually involving two or three parallel stringers such as two by fours across which are nailed a series of 1" boards in either edge to edge or spaced relation. Obviously the warping and twisting of the pallet as it is raised and lowered by the lift truck causes the nails to give slightly, weakening the pallet and making possible damage to the goods carried on the pallet. Continued use thereafter under similar rigorous conditions causes even greater deterioration, eventually rsulting in splitting of the boards and ultimate scrapping of the pallets.

While the life of such pallets has been extended by inexpensive improvements of the type described and illustrated in the co-pending application of Charles S. White and A. Frank Garbarino Serial No. 381,374 filed September 21, 1953, for improvements in Pallets, now Patent No. 2,817,485, there nevertheless remains the desirability of providing additional strength or support, particularly at the center or intermediate stringer of pallets comprising three or more stringers.

Accordingly I have designed an improved construction for pallets adapted in particular to increase the strength of pallets comprising more than two stringers; however, it is to be understood that my improved construction is also applicable to pallets comprising only two stringers.

It is a primary object of this invention to provide an improved pallet capable of withstanding prolonged use, the present invention being applicable to pallets of various sizes.

Other objects and many of the attendant advantages of this invention will be readily appreciated as the same becomes better understood by reference to the following detailed description when considered in connection with the accompanying drawings, wherein.

Before describing the present invention in detail it will be understood that it is applicable to pallets of varying dimension in which the horizontal dimension may, for example, be in the order of 34 x 48" or 48 x 48" while the overall vertical dimension may be on the order of 5 to 6". It is also understood that while the invention is illustrated in connection with pallets having three stringers, it is also applicable to pallets having only two or more than three stringers.

Figure 1:
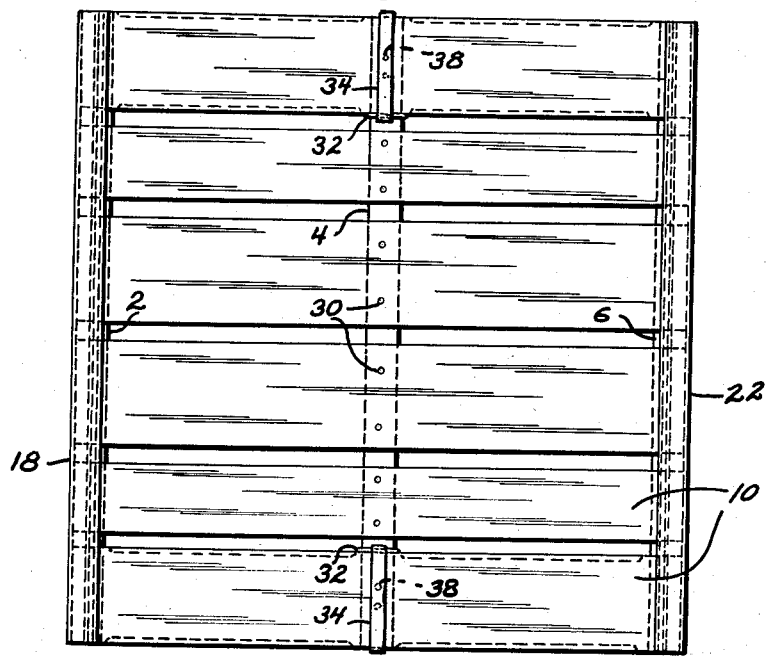
Fig. 1 is a plan view of a pallet embodying the present invention.
Figure 2:
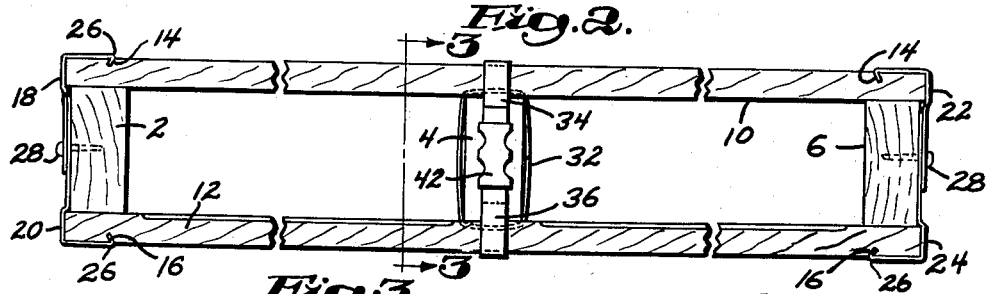
Fig. 2 is an enlarged end view of the pallet of Fig. 1.

Referring to Figs. 1 and 2, there is shown a typical double faced pallet comprising three parallel members or stringers 2, 4, and 6, held in spaced relation to each other by a plurality of upper and lower boards 10 and 12 respectively. Cross pieces 10 and 12 are provided with diagonal sloping grooves 14 and 16 respectively which run parallel to the stringers 2, 4, and 6. Along the opposite sides of the pallet are reinforcing members comprising a first pair of channel irons 18 and 20, and a second pair of identical channel irons 22 and 24. These angle irons are each provided with inturned flanges 26 which reside in grooves 14 and 16. The members of each pair of channel irons are connected together by screws or nails 28 which force the vertical portions of the channel irons into tight frictional engagement with the side stringers 2 and 6. Screws 28 prevent the channel irons from separating so as to maintain the inturned flanges 26 in grooves 14 and 16. In this manner the channel irons serve to hold the ends of boards 10 and 12 in fixed relation to the end stringers 2 and 6 so as to permit the pallet to be used repeatedly with a minimum of deterioration. The concept of utilizing channel members for strengthening the pallets is disclosed in the aforesaid co-pending application of Charles S. White and A. Frank Garbarino, and forms no part of the present invention. Other forms of channel members may be used. A third alternative is to employ no channel members at all, and to secure the ends of the cross pieces to the stringers by means of nails or screws alone.

The boards 10 and 12 are also secured to the upper and lower surfaces of center stringer 4 by means of nails 30. This is conventional practice and also forms no part of the present invention.

However, since nails alone have proven to be insufficient over a period of prolonged use to prevent the end boards from bending away from the center stringer 4, it is contemplated according to the present invention to provide additional means for reinforcing the end boards of the upper and lower cross boards 10 and 12 at the opposite ends of the center stringer 4. While not illustrated it is also to be understood that the additional reinforcing means to be hereinafter described may be also employed to reinforce the connection between the end boards of boards 10 and 12 and the side stringers 2 and 6.

Figure 3:
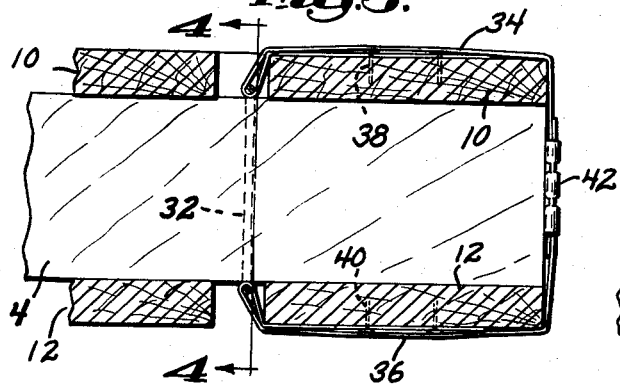
Fig. 3 is an enlarged sectional view taken along line 3—3 of Fig. 2.
Figure 4:
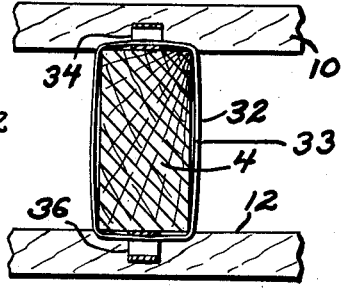
Fig. 4 is a sectional view taken along line 4—4 of Fig. 3.

Referring specifically now to Figs. 2, 3 and 4, it is contemplated to provide means to which a flexible preferably two-piece metal strap 34, 36, may be attached at both the top and bottom of the center stringer 4 at positions between the end cross pieces 10 and 12 and the cross pieces 10 and 12 immediately adjacent thereto. The means for securing the metal straps 34 and 36 to the center stringer 4 may take various forms, such as screw eyes, eye bolts, or preferably as disclosed in the drawings a metallic ring 32 bent about or slid on the center stringer 4 and welded at 33 for greater strength. The top strap piece 34 is secured first at one end to the upper surface of end cross piece 10 by means of nails or screws 38. The upper portion of the strap is then bent down and under the portion of metallic ring 32 that overlies the upper surface of the center stringer 4 and then brought back over its secured end to the end of the pallet. The second portion 36 is secured to the bottom cross piece 12 by means of nails or screws 40 and looped about the portion of ring 32 that underlies the bottom surface of center stringer 4 in the same fashion. The free ends of the two sections of metal strap are then brought together and drawn toward each other under tension by a suitable device which also applies a fastening element 42 which is crimped as illustrated to hold the two portions of the metal strap in secured relation to each other. The metal strap then operates to prevent the end cross boards 10 and 12 from flexing away from the center stringer 4 so as to give the whole pallet greater strength.

The same assembly is accomplished at the opposite end of the pallet so that both ends of the pallet are strengthened to approximately the same degree. In the case of a pallet lacking the metal channel irons overlying the ends of the cross pieces and the side stringers it is contemplated that the same means, the ring 32 and the metallic strap comprising sections 34 and 36 may be employed to strengthen the connection between the end cross pieces and the side stringers of the pallet in the same fashion.

While the metallic strap rides slightly above and below the end cross pieces 10 and 12, it has been found in practice that it does not protrude so high as to constitute a hazard to the goods loaded on the pallet. The metal straps are, of course, quite resistive to wear and are of sufficient strength to withstand prolonged and repeated tensioning.

It is believed apparent that the means illustrated in the drawings for strengthening the pallets is inexpensive and can be applied to pallets already in use as well as to pallets to be manufactured in the future. A further advantage is that the straps may be easily applied by hand in the manner described hereinabove without requiring tools or materials of special design not available on the market.

Obviously many modifications and variations of the present invention are possible in the light of the above teachings. Therefore, it is to be understood that the invention is not limited in its application to the details of construction and arrangement of parts specifically described or illustrated.

I claim:

1. In a double faced pallet the improvement comprising a metallic ring surrounding a stringer of said pallet, first and second cross-pieces secured to the upper and lower surfaces of said same stringer between said ring and the end of said stringer, a first metallic strap element secured at one end to the upper surface of said first cross piece, a second strap element secured at one end to the lower surface of said second cross piece, said first and second strap elements each being looped about said ring and doubled back on their respective cross pieces and the end of said stringer, and means securing the free ends of said two strap elements together under tension, whereby to maintain said cross pieces in fixed engagement with said stringer.

2. In a pallet comprising a structure having at least two stringers with upper and lower surfaces, said stringers being in parallel spaced relation and having a plurality of crosswise extending boards secured to said stringers, that improvement for making a board at the end of one of the stringers more securely affixed thereto comprising a metal strap means including connecting means and extending in the direction of said stringer and having one end thereof secured to said board by headed fasteners passing through said strap and into said board at a position over said stringer, an element attached to said stringer adjacent the edge of said board that is remote from the end of said stringer, said strap leading away from said secured end to pass between said element and the upper surface of said stringer and then doubled back toward the end of said stringer to overlie said fasteners and said board, said strap then passing downwardly over the end of said stringer and thence running in the direction of and paralleled to the lower surface of said stringer, then doubled back around another element to pass between said other element and the said lower surface of said stringer, the other end of said strap secured by other headed fasteners passing through said strap into the stringer at a position opposite said first headed fasteners with said strap overlying said other headed fasteners, said strap being in substantial tension while anchored at its ends by said fasteners with said fasteners being in shear only.

3. In a pallet comprising a structure having at least two stringers with upper and lower surfaces, said stringers being in parallel spaced relation and having a plurality of crosswise extending boards secured to the upper and lower surfaces of said stringers, that improvement for making upper and lower boards located at the end of one of the stringers more securely affixed thereto comprising a metal strap means including connecting means and extending in the direction of said stringer and having one end thereof secured to the upper board by headed fasteners passing through said strap and into said upper board at a position over said stringer, an element attached to said stringer adjacent the edge of said upper board that is remote from the end of said stringer, said strap leading away from said secured end to pass between said element and the upper surface of said stringer and then doubled back toward the end of said stringer to overlie said fasteners and said upper board, said strap then passing downwardly over the end of said stringer and thence running in the direction of and parallel to the lower surface of said lower board, then doubled back around another element to pass between said other element and the said lower surface of said stringer, the other end of said strap secured by other headed fasteners passing through said strap into the lower board at a position opposite said first headed fasteners with said strap overlying said other headed fasteners, said strap being in substantial tension while anchored at its ends by said fasteners with said fasteners being in shear only.

References Cited in the file of this patent

UNITED STATES PATENTS

| | | |
|---|---|---|
| 112,375 | Perkins | Mar. 7, 1871 |
| 325,969 | Redding | Sept. 8, 1885 |
| 1,209,511 | Staley | Dec. 19, 1916 |
| 2,395,982 | White | Mar. 5, 1946 |

FOREIGN PATENTS

| | | |
|---|---|---|
| 131,602 | Sweden | May 2, 1951 |